United States Patent [19]

Gervais

[11] Patent Number: 5,448,725
[45] Date of Patent: Sep. 5, 1995

[54] APPARATUS AND METHOD FOR ERROR DETECTION AND FAULT ISOLATION

[75] Inventor: Gilles Gervais, Schönbuch, Germany

[73] Assignee: International Business Machines Corporation, Armonk, N.Y.

[21] Appl. No.: 239,164

[22] Filed: May 5, 1994

Related U.S. Application Data

[63] Continuation of Ser. No. 735,563, Jul. 25, 1991, abandoned.

[51] Int. Cl.⁶ .................................................. G06F 11/00
[52] U.S. Cl. .................................. 395/184.01; 371/48; 395/182.18
[58] Field of Search .................. 371/29.1, 165, 48; 395/575

[56] References Cited

U.S. PATENT DOCUMENTS

| | | | |
|---|---|---|---|
| 3,293,612 | 12/1966 | Ling | 340/172.5 |
| 3,784,801 | 1/1974 | Caputo | 371/29.1 X |
| 3,873,819 | 3/1975 | Greenwald | 235/153 AK |
| 4,045,661 | 8/1977 | Antoine | 235/153 AC |
| 4,593,391 | 6/1986 | Mizushima | 371/16.5 |
| 4,660,198 | 4/1987 | Lyon | 371/15 |
| 4,661,953 | 4/1987 | Venkatesh | 371/16.5 |
| 4,679,195 | 7/1987 | Dewey | 371/29 |
| 4,802,089 | 1/1989 | Shaw | 364/200 |
| 4,916,697 | 4/1990 | Roche | 371/14 |
| 4,932,028 | 6/1990 | Katircioglu | 371/16.5 |
| 4,932,028 | 6/1990 | Katircfioglu et al. | 371/16.5 |
| 5,008,885 | 4/1991 | Huang | 371/3 |

FOREIGN PATENT DOCUMENTS

| | | |
|---|---|---|
| 0167827 | 6/1985 | European Pat. Off. . |
| 1474062 | 8/1969 | Germany . |
| 0115560 | 7/1983 | Japan ................................. 371/29.1 |

OTHER PUBLICATIONS

IBM Technical Disclosure Bulletin, vol. 30, No. 1, Jun. 1987, Titled "Primary Error Detection System for I/O Apparatus".

*Primary Examiner*—Robert W. Beausoliel, Jr.
*Assistant Examiner*—Glenn Snyder
*Attorney, Agent, or Firm*—Lawrence D. Cutter

[57] ABSTRACT

Error detection and fault isolation mechanisms generally require separate capture latches to capture every occurrence of an error (for example from a parity checker or timeout counter) and an associated mask latch to temporarily or permanently block further detection of the same error. In the claimed invention, the mask latch is replaced by a single error control mechanism which is able to set and reset the error capture latches. The detected error is held in the capture latch, thus preventing further error capture, until a signal from the single error control mechanism resets the latch.

10 Claims, 5 Drawing Sheets

APPARATUS AND METHOD FOR ERROR DETECTION AND FAULT ISOLATION

This is a continuation of application(s) Ser. No. 07/735,563 filed on Jul. 25, 1991, now abandoned.

FIELD OF THE INVENTION

Hardware error reporting logic in a computer system usually requires that a mask register be associated with each error capture latch so that the reporting of specific errors may be disabled if necessary. The invention described herein eliminates the need for an error mask register while maintaining all the necessary functions of this register.

BACKGROUND OF THE INVENTION

In a distributed processor control unit, a main processor supervises separate controls or controllers provided for each of the different sectors of the machines, e.g., input/output controllers. In such an environment, error detection and subsequent problem determination is complicated. The system requires means to identify any errors that occur and then to interrupt the working of the main processor while the error is evaluated and, if necessary, corrected. If more than one error occurs in any particular time period or if, during the evaluation of one error, a second error occurs, then means have to be provided to ensure that the occurrence of this second error does not influence the evaluation of the first error. In addition, it is desirable that a record is kept of the occurrence of the second error such that it can be evaluated after the main processor has completed its work on the first error. Some errors are of such significance that they cannot be corrected by the processor and means have to be provided for isolating these faults such that their repeated occurrence does not continually interrupt the functioning of the main processor.

In current systems where such error detection and fault isolation is implemented, each logic chip has an error reporting register and an associated error mask register, both of which can be read and/or written by the error handling mechanism. A mask register is used either to temporarily disable specific errors so as to allow other errors to be reported, or to permanently disable a specific interrupt in the case of defective error detection circuitry. Examples of such systems are shown in Research Disclosure No. 25236, titled "Priority Status Recording with Mask Capability", published on Apr. 10, 1985, IBM Technical Disclosure Bulletin, titled "Primary Error Detection System for I/O Apparatus", Vol. 30, No. 1, June 1987, pp 379-380 and in U.S. Pat. No. 4,932,028 titled "Error Log System for Self-Testing in Very Large Scale Integrated Circuit (VLSI) Units", issued Jun. 5, 1990 to H. Katircioglu, et al.

FIG. 1 shows a simplified view of a current approach for error logic using mask registers. For every error capture latch 20, 22, there is an associated mask latch 30, 32 which can be used in conjunction with AND gate 40, 42 to block the error from generating an interrupt in the interrupt latch 50 which is controlled through OR gate 45. To set and reset each mask latch 30, 32, control logic 10, 12 is needed to decode control commands from the error handling mechanism. In applications where there are numerous error logging elements (error capture latches), the hardware overhead for implementing the mask logic is certainly substantial. The logic gates required occupy a lot of space on the chip and are comparatively slow and inflexible.

SUMMARY OF THE INVENTION

The invention consists of replacing all the existing mask latches and corresponding mask control logic circuitry by a single error control mechanism. This error control mechanism receives a pulse from each capture latch whenever an error message is detected. It passes the first error message it receives to the interrupter and blocks or masks the passage of further error messages. These further error messages, however, are still held in their respective capture latches so that they can be later passed to the main processor after it has finished its evaluation of the first error occurrence. Means are also provided for permanently disabling any error input if this is required.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
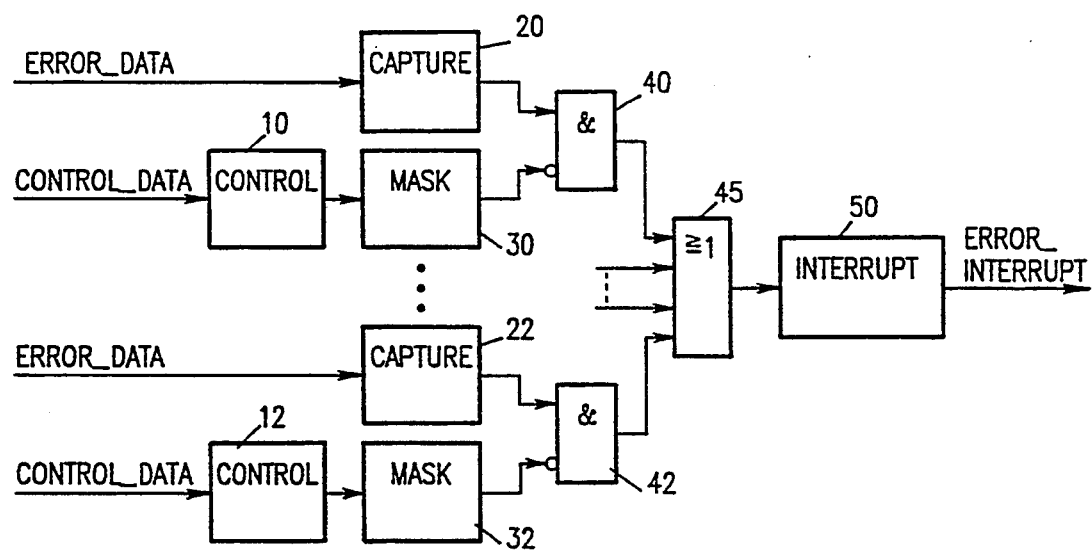
FIG. 1 shows a simplified view of current error logging approaches using mask registers.
Figure 2:
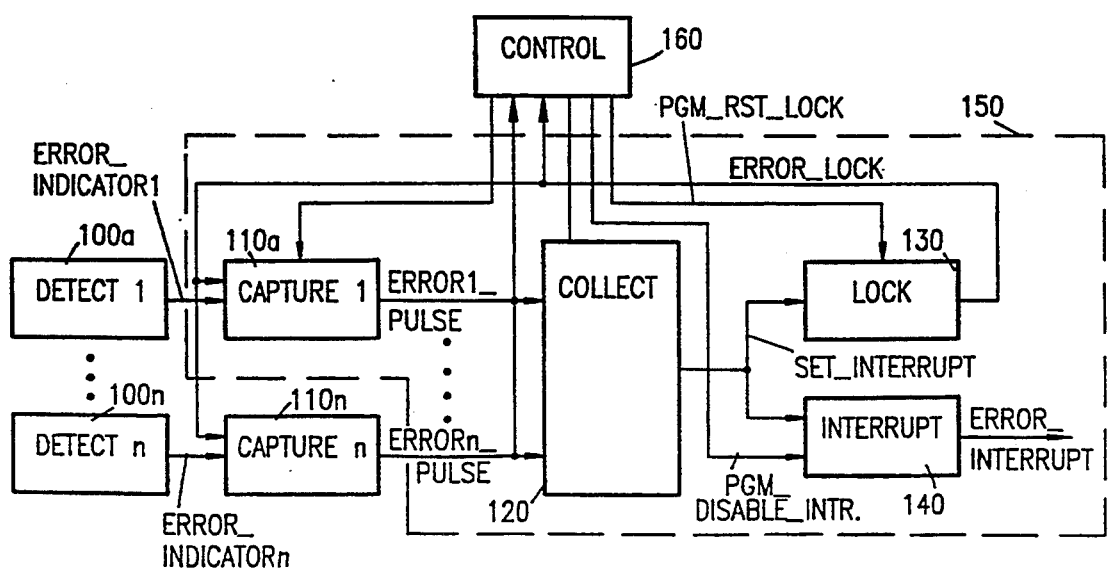
FIG. 2 shows a functional block diagram of self masking error capture and lock mechanisms incorporating the error control mechanism of the present invention.

A block diagram of the basic elements involved in the error detection and reporting mechanism is shown in FIG. 2. It shows a series of error detection elements $100a$–$100n$ connected to error capture elements $110a$–$110n$. These are in turn connected to error collector 120. Error collector 120 has two outputs, one of which is to interrupt generator 140 which sends a signal to the microprocessor (not shown) to interrupt its current processing, and the other of which is to lock generator 130 which in turn is connected to all error capture elements $110a$–$n$. Error control mechanism 160 is connected to each of these units and produces signals to control the sequence in which errors are handled, to block the collection of further errors and to disable the generation of interrupt signals. It further includes means to monitor which error detection elements have detected an error and which error reports still require attention. The area enclosed by the dotted lines represents error capture and lock mechanism 150 and is shown in more detail in FIG. 3.

Figure 3:
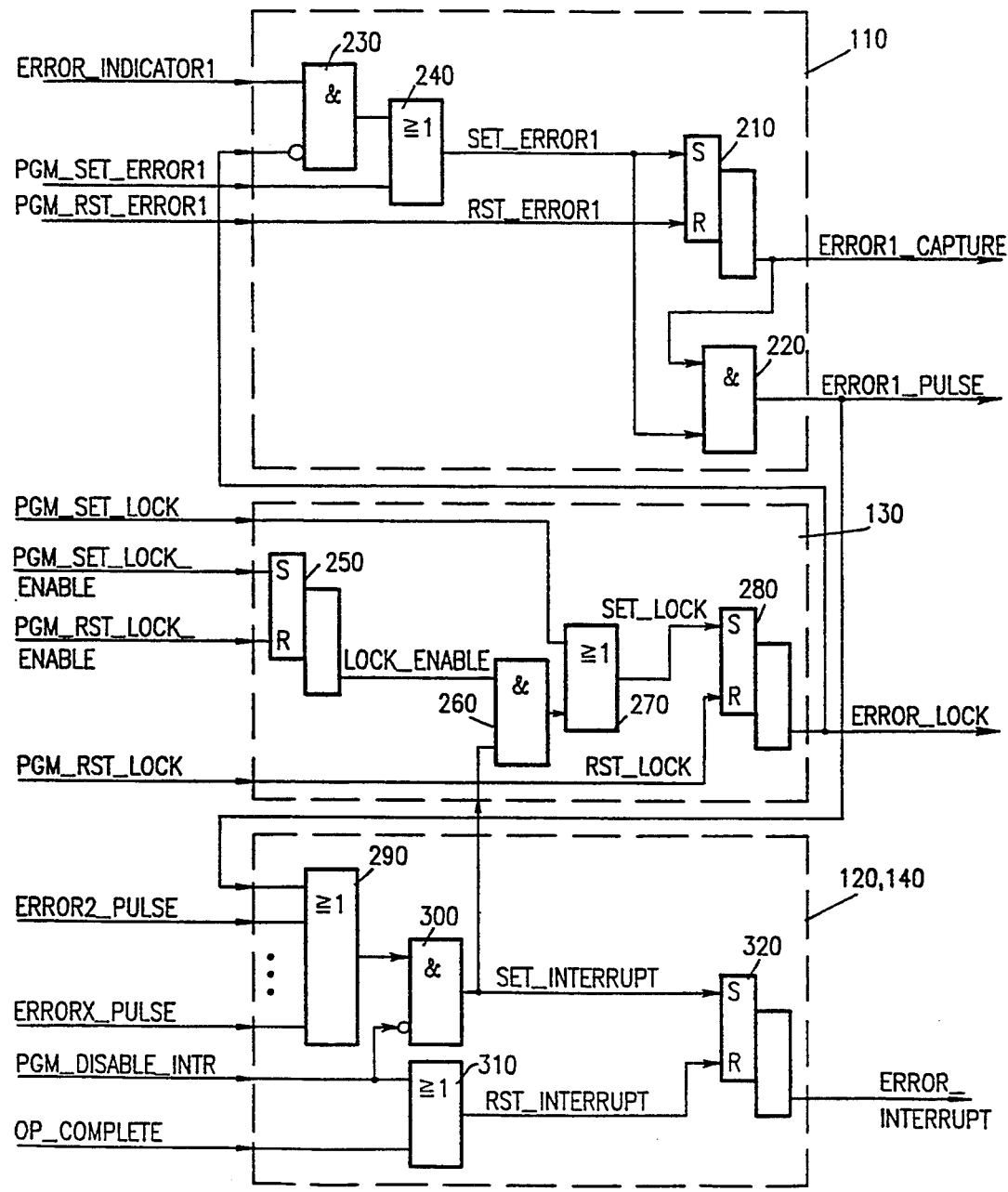
FIG. 3 shows the error handling mechanism in greater detail.

The general operation of the error capture and lock mechanism 150 is now described in connection with FIGS. 2 and 3. Errors are detected in error detection elements $100a$–$100n$ and must be active for at least one clock cycle. These error detection elements may be formed of any standard error detection logic elements such as parity checkers, timeout counters, etc. For the sake of simplicity, the operation of the invention will be described by assuming that an error has been detected by error detection element 100a. The principles of the procedure can, of course, be generally applied to an error detected in any of error detectors 100a–100n.

On detection of an error, error detection element 100a passes a signal ERROR_INDICATOR1 to the appropriate error capture element 110a. There is one capture element 110 for each error detection element 100. The first active transition of the error indicator signal sets capture latch 210 in error capture element 110. Setting capture latch 210 generates a signal ERROR1_CAPTURE which is passed to AND gate 220 and can also be sent to error control mechanism 160. Once capture latch 210 is set, subsequent changes in the state of error detector 100a do not affect the state of capture latch 210. This latch serves three purposes. Firstly, it acts as an error logging register. After it has been set, capture latch 210 remains set until it is reset by a signal PGM_RST_ERROR1 generated by error control mechanism 160. Thus a group of capture latches 210 acts as an error register where the current error status can be read or written by error handling mechanism 160 using signal ERROR1_CAPTURE to indicate the status of latch 210, signal PGM_SET_ERROR1 to set latch 210 or signal PGM_RST_ERROR1 is reset latch 210. Secondly, latch 210 acts as an error pulse generator. After the input to the latch has become active, pulse ERROR1_PULSE is generated via AND gate 220 that is used to trigger both interrupt generator 140 and (less directly) lock generator 130. Finally, capture latch 210 acts also as a mask register since further operation of ERROR1_PULSE is inhibited when the output of capture latch 210 is active. Hence subsequent changes in the state of error detector 100a do not trigger the interrupt and lock stages 140 and 130 respectively. Further errors are therefore essentially 'masked'.

As already described, the signal (ERROR1_CAPTURE) from capture latch 210 is passed to AND gate 220 where it generates pulse, ERROR1_PULSE, which is in turn passed directly to OR gate 290 and AND gate 300 within error interruptor 140 and indirectly to lock generator 140. The pulse is used in error interruptor 140 to set interrupt latch 320 as long as no PGM_DISABLE_INTR signal is being sent from error control mechanism 160 to disable error interruptor 140. Setting interrupt latch 320 sends an ERROR_INTERRUPT signal to the next level in error reporting hierarchy. This level could, for example, be directly connected to the microprocessor to tell it to stop its current operation and deal appropriately with the detected error. The next level acknowledges that it has detected the interrupt by sending an OP_COMPLETE signal which is used to rearm interrupt generator 140 by resetting interrupt latch 320.

Lock generator 130 can be enabled or disabled by signals from error control mechanism 160. When disabled (PGM_RST_LOCK_ENABLE high), all errors can be captured at any time. However, when lock generator 130 is enabled (PGM_SET_LOCK_ENABLE high) then the detection of the first error produces ERROR_LOCK signal from latch 280 which is passed to a negated input of AND gate 230 and hence blocks the capture of all subsequent errors. The ERROR_LOCK signal can also be returned to error control mechanism 160 to indicate that the capture of further errors has been masked. Typically, once all of the capture latches have been read (for example by detection of ERROR_CAPTURE signals in error control mechanism 160), error control mechanism 160 unlocks the error reporting logic by resetting lock latch 280 using signal PGM_RST_LOCK.

Error control mechanism 160 can permanently mask errors by individually disabling error capture elements 110a–110n using the following procedure. Firstly, all interrupts are disabled by blocking the setting of interrupt latch 320 using the PGM_DISABLE_INTR signal through OR gate 310. A signal PGM_SET_ERROR1 (more generally PGM_SET_ERRORn) is then sent through OR gate 240 to each capture latch 210 which is to be masked. This signal sets capture latch 210 so that future changes in ERROR_INDICATOR1 signal cannot generate an ERROR1_PULSE signal. Finally, error interruptor 140 is re-enabled by making the PGM_DISABLE_INTR signal inactive to remove the forced reset of interrupt latch through OR gate 310.

Figure 4:
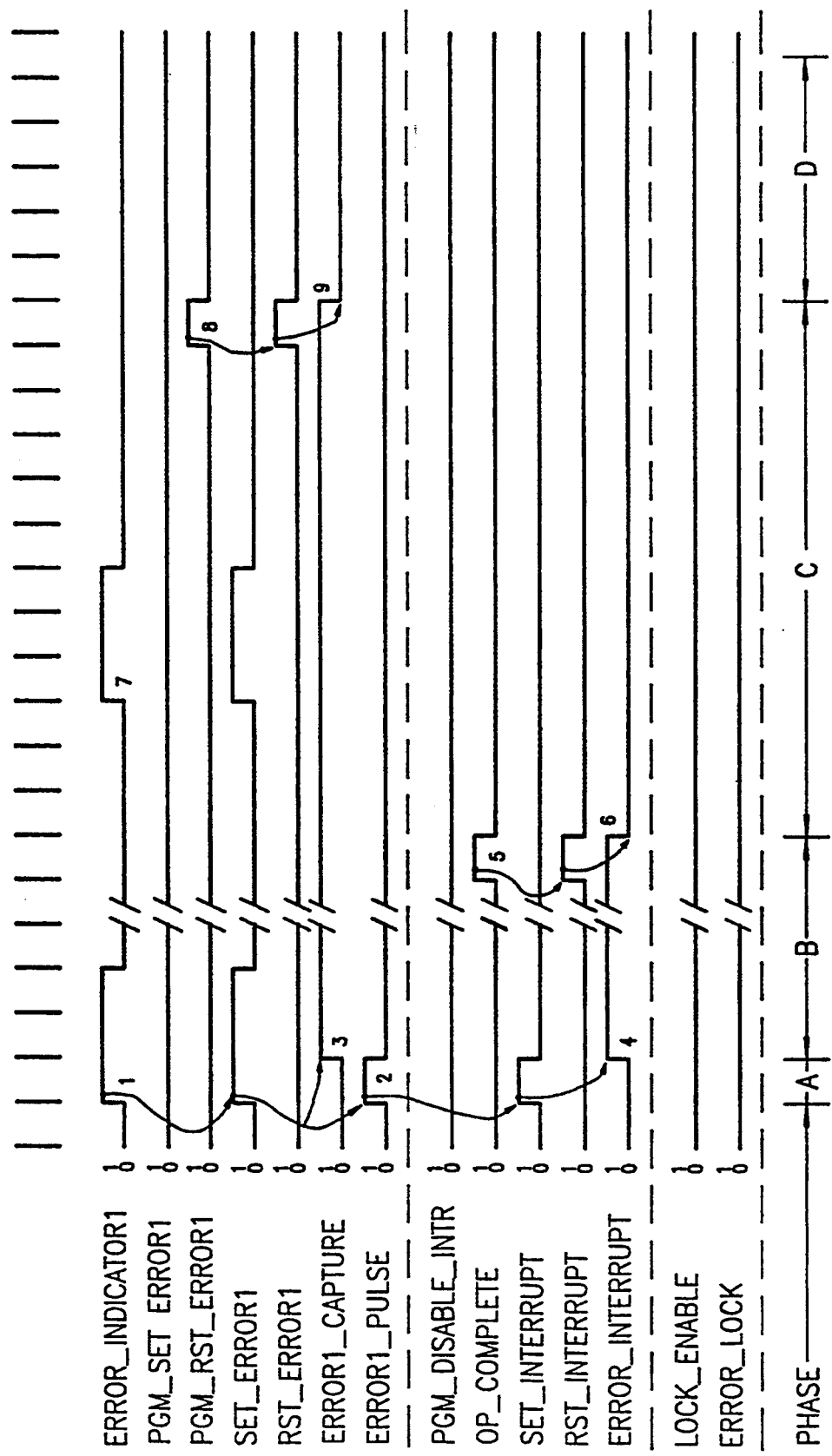
FIG. 4 shows a timing diagram for basic error capture and reporting.

Understanding of the invention can also be improved by considering timing diagrams associated with various operational sequences. The timing diagram of FIG. 4 shows the basic error capture and reporting sequence for the case where only one error is detected in the hardware. The error lock mechanism is disabled, that is, LOCK_ENABLE signal from latch 250 is inactive, in this example. In the discussion below referring to FIGS. 4, 5 and 6, reference numerals 1–52 in parentheses refer to the numerals present in these three figures only. The sequence of events is as follows:

Phase A: In this phase, error detector 100a (1) creates an ERROR1_PULSE signal (2) and sets capture latch 210 (3). This error pulse is used to set interrupt latch 320 (4).

Phase B: Once the interrupt signal is made active, a feedback signal is used to indicate that the interrupt has been logged elsewhere in the system (for example in the microprocessor). This feedback signal is denoted as OP_COMPLETE in the timing diagram. It is used (5) to reset interrupt latch 320 (6).

Phase C: After some time, error control mechanism 160 senses capture latches 210 to determine the source of the interrupt. Capture latch 210 is then reset under control of error control mechanism 160 (8 and 9) so that subsequent error indicators do create an interrupt. Note that during this time, the second error detected by the error indicator (7) did not create an interrupt since active capture latch 210 was effectively masking it.

Phase D: Once the capture latch has been reset (9) using the RST_ERROR1 signal, the error indicator is once again able to generate interrupts.

Figure 5:
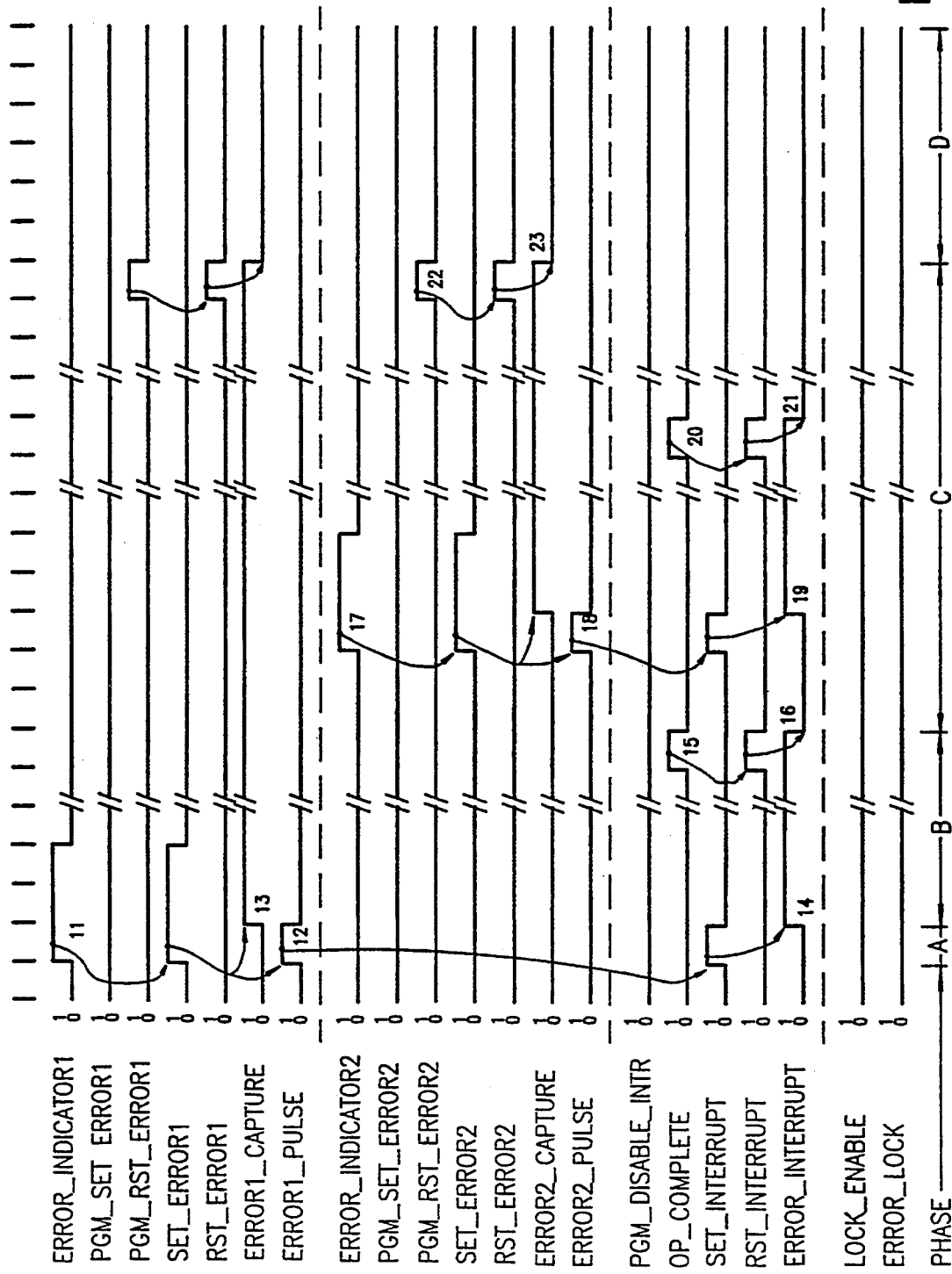
FIG. 5 shows a timing diagram for multiple error capture and reporting.

The timing diagram shown in FIG. 5 demonstrates the basic error capture and reporting sequence for the case where multiple errors are detected in the hardware. The error lock mechanism is again disabled (LOCK_ENABLE inactive) in this example. The sequence is basically the same as that described above for single error capture and reporting except that here two errors are detected (11 and 17). The events are identical to those described above except that two interrupts are generated (14 and 19). Note that the first error indicator does not block the second indicator from being captured.

Figure 6:
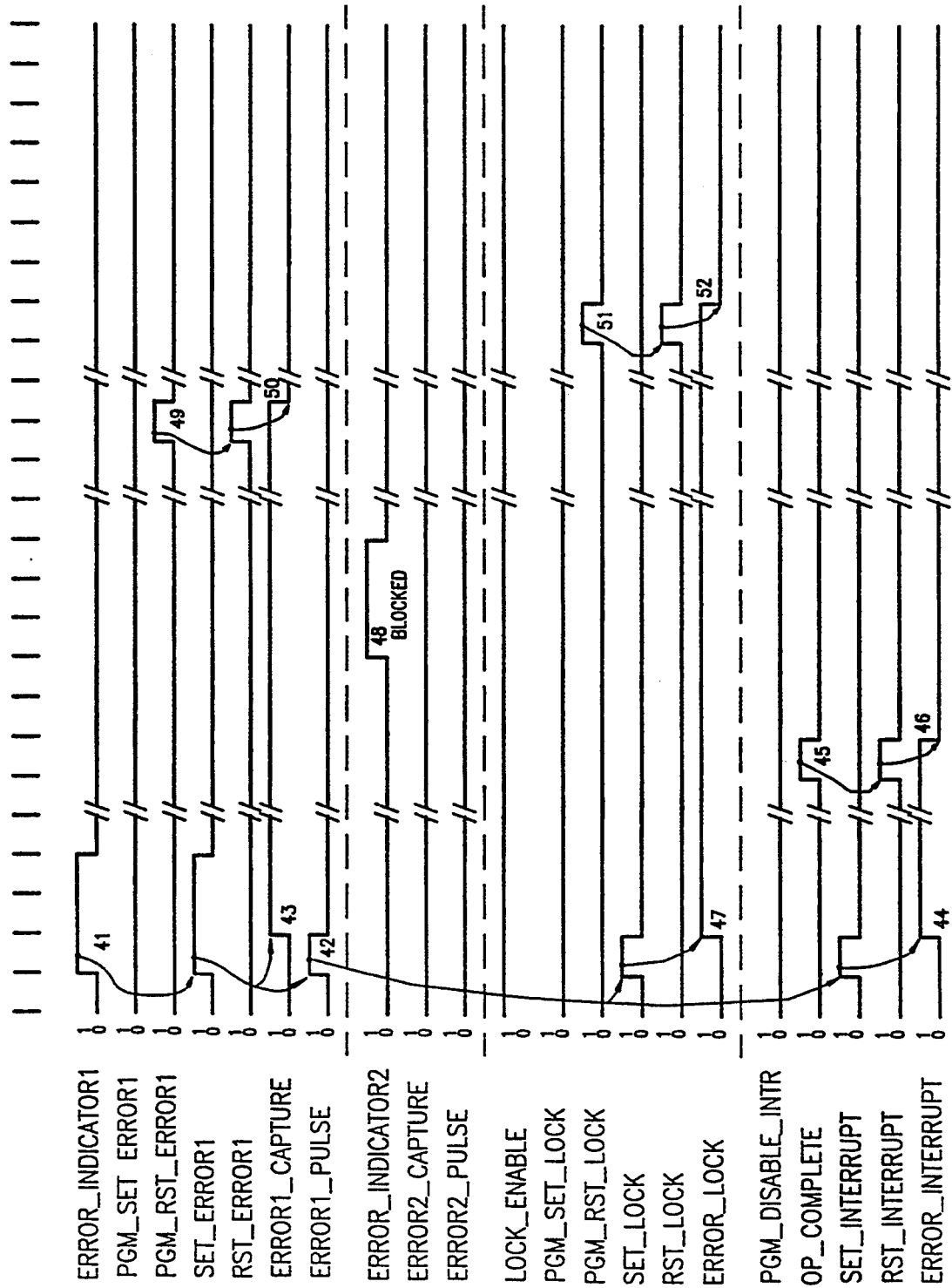
FIG. 6 shows a timing diagram for multiple error capture, lock and reporting.

Finally the basic multiple error capture, lock and reporting is described with reference to FIG. 6. The error lock mechanism is enabled by setting the LOCK_ENABLE signal line to an active state. The sequence is the same as that described in the above two examples. However, the generation of the error pulse (42) now sets the error lock (47). This error lock blocks subsequent error indicators (48) from being captured and generating an interrupt. For example, ERROR_INDICATOR2 (48) is not captured and therefore does not create an interrupt. This feature is especially useful for hardware start-up activity to determine which errors occur first. Once the error indicator(s) have been sensed and reset (49 and 50) by error control mechanism 160, the error lock is reset (51 and 52) so as to re-enable the capture and reporting of errors.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed:

1. An error detection and fault isolation mechanism for use in a data processing system, said mechanism comprising:
   a plurality of error detection means for detecting the occurrence of an error;
   capture means, coupled to said error detection means, to store indications that errors have been detected;
   interrupt generating means for generating an interrupt when the occurrence of an error is detected by said error detecting means;
   a plurality of lock generating means for independently blocking the detection of individual ones of said error occurrences by said error detecting means; and
   single error control means for providing an interrupt signal indication to said interrupt generating means and to said lock generating means, said single error control means operating to block the detection of individual ones of said error occurrences without affecting previously stored error indications and further operating to inhibit said interrupt generating means when an associated error is still pending.

2. The error detection and fault isolation mechanism of claim 1 wherein said error detection means comprises:
   an error detection element;
   means to signal to said single error control means that an error has been detected; and
   means to signal to said interrupt generating means that an error has been detected.

3. The error detection and fault isolation mechanism of claim 2 wherein said error detection means further comprises:
   means to temporarily block the detection of further errors.

4. The error detection and fault isolation mechanism of claim 2 wherein said error detection means further comprises:
   means to isolate the detection of further errors; and
   means to re-enable the detection of further errors.

5. The error detection and fault isolation mechanism of claim 2 wherein said error detection element comprises a parity checker.

6. The error detection and fault isolation mechanism of claim 2 wherein said error detection element comprises a timeout counter.

7. The error detection and fault isolation mechanism of claim 1 wherein said interrupt generating means comprises:
   means to receive from each of said plurality of error detection means a signal to indicate that an error has been detected;
   means to signal to a next error report hierarchy level that an error has been detected; and
   means to receive a signal from said next error report hierarchy level to indicate that it has finished processing the error report.

8. The error detection and fault isolation mechanism of claim 7 wherein said interrupt generating means further comprises:
   means to temporarily disable the generation of the said signal to said next error report hierarchy level.

9. The error detection and fault isolation mechanism of claim 1 wherein said lock generating means comprises:
   means to signal to the said error detection means; and
   means to temporarily block further capture of errors.

10. The error detection and fault isolation mechanism of claim 1 wherein said error control means comprises:
    means to enable and disable said interrupt generating means;
    means to enable and disable said lock generating means;
    means to enable and disable said error capture means;
    means to store reports of error capture; and
    means to monitor which reports still require attention.

* * * * *